United States Patent [19]

Garbelman et al.

[11] Patent Number: 4,982,832

[45] Date of Patent: Jan. 8, 1991

[54] CERAMIC TILE CONVEYOR

[75] Inventors: David L. Garbelman, Edmond; Raymond E. Montgomery, Oklahoma City, both of Okla.

[73] Assignee: CMI Corporation, Oklahoma City, Okla.

[21] Appl. No.: 309,118

[22] Filed: Feb. 13, 1989

[51] Int. Cl.⁵ .............................................. B65G 19/18
[52] U.S. Cl. .............................. 198/735.3; 198/735.4
[58] Field of Search ............... 198/734, 735, 841, 725, 198/728

[56] References Cited

U.S. PATENT DOCUMENTS

| | | | |
|---|---|---|---|
| 2,372,798 | 4/1945 | Sinden | 198/735 X |
| 3,902,587 | 9/1975 | Checcucci | 198/725 X |
| 3,964,800 | 6/1976 | Grimes et al. | 198/841 X |
| 4,019,624 | 4/1977 | Torres | 198/728 X |
| 4,325,480 | 4/1982 | Butt | 198/841 |
| 4,471,868 | 9/1984 | Buschbom et al. | 198/735 |
| 4,561,546 | 12/1985 | Maroney | 198/728 X |

FOREIGN PATENT DOCUMENTS 2411355  8/1979  France ............................ 198/735

*Primary Examiner*—Joseph E. Valenza
*Assistant Examiner*—Cheryl L. Gastineau
*Attorney, Agent, or Firm*—Dunlap, Codding, Peterson & Lee

[57] ABSTRACT

An improved ceramic tile conveyor is provided having a pair of guide plates extending substantially the length of the conveyor. The guide plates provide an impact barrier protecting the ceramic tile from damage caused by contact with the revolving flights of the slat conveyor.

10 Claims, 3 Drawing Sheets

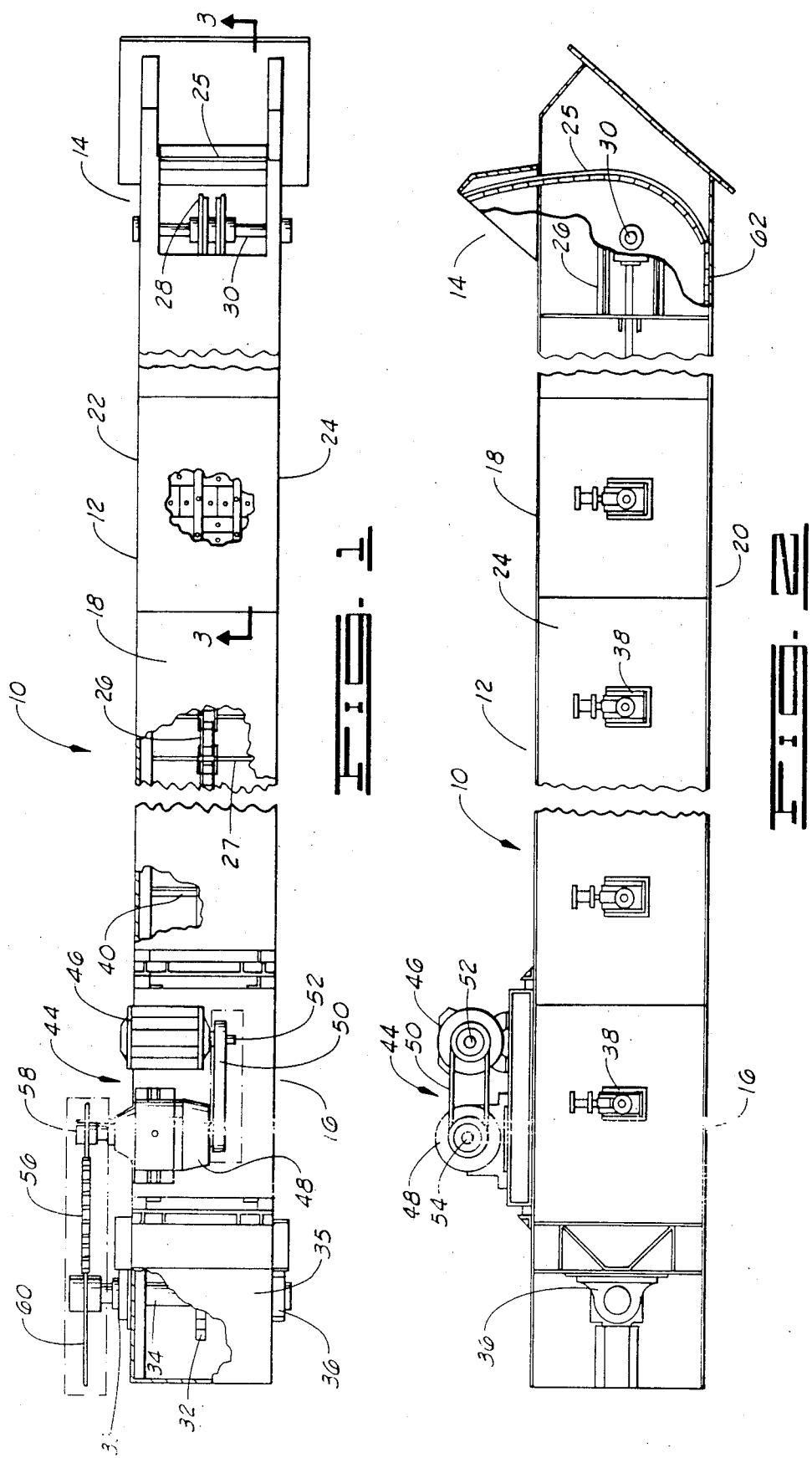

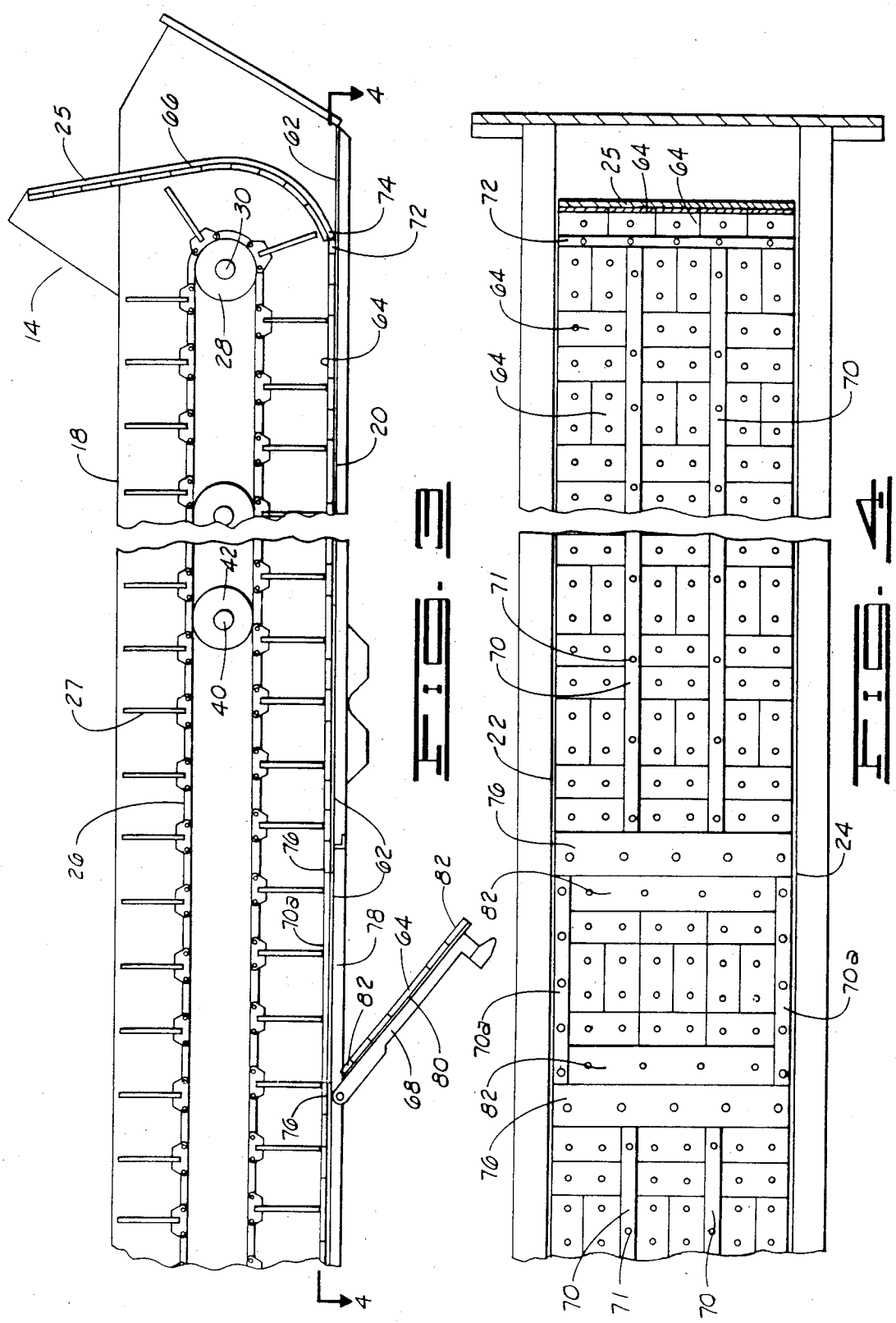

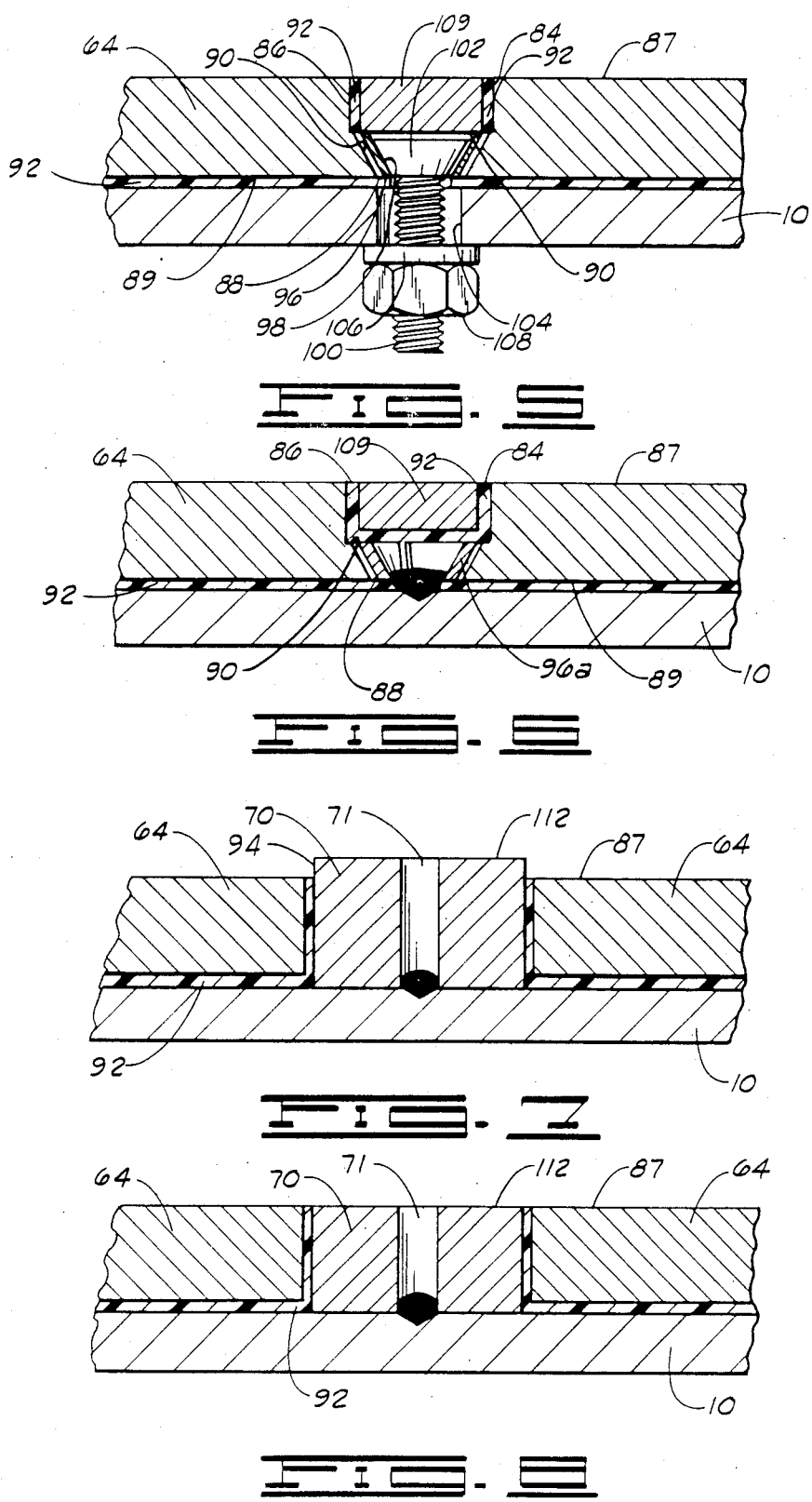

CERAMIC TILE CONVEYOR

BRIEF SUMMARY OF THE INVENTION

1. Field of Invention.

The present invention relates generally to drag chain slat conveyors.

2. Background of the Invention.

The present invention provides an economical and efficient system for protecting a wear resistant ceramic surface within the slat conveyor from damage by the revolving slats.

Generally, in the operation of a slat conveyor, a quantity of material is introduced into the conveyor at an input end and is moved substantially the length of the conveyor to a discharge end by a plurality of revolving flights secured to an endless rotating chain. In some instances, abrasive particulate material is conveyed within the slat conveyor. In these instances the surface of the conveyor contacted by the abrasive particulate material becomes severely eroded, thus requiring replacement or the installation of a fresh overlying surface.

In an effort to prevent the erosion of the conveyor surface by the movement of abrasive materials thereon, an overlying ceramic surface is secured to the conveyor surface. However, while the ceramic surface possesses superior wear resistant properties to a steel or a steel alloy surface, the ceramic surface is relatively brittle and may be damaged by the revolving slats.

This invention comprises a conveyor having a ceramic surface and a pair of guide plates secured to the conveyor. The guide plates are positioned adjacent a portion of the ceramic surface along the path of the material for preventing the slats from damagingly contacting the ceramic surface.

BRIEF DESCRIPTION OF THE DRAWINGS

FIG. 1 is a top plan view of a conveyor constructed in accordance with the invention with portions broken away to show some internal structure.

FIG. 2 is an elevational view of the conveyor with portions broken away to show some internal structure.

FIG. 3 is a cross-sectional view taken along lines 3—3 of FIG. 1.

FIG. 4 is a cross-sectional view taken along lines 4—4 of FIG. 3.

FIG. 5 is an enlarged fragmented cross-section of a ceramic tile secured to the conveyor surface.

FIG. 6 is a view similar to FIG. 5 illustrating an alternate system for securing the ceramic tile to the conveyor surface.

FIG. 7 is an enlarged fragmented cross-section of a guide plate secured to the conveyor surface between ceramic tiles.

FIG. 8 is a view similar to FIG. 7.

DETAILED DESCRIPTION OF THE DRAWINGS

Referring to the drawings in detail, and particularly FIGS. 1-3, reference character 10 generally designates a slat conveyor constructed pursuant to this invention. The slat conveyor 10 includes a housing 12 having an input end 14 and an output end 16. The housing 12 is substantially rectangular in cross section having an upper wall 18, a lower wall 20, a first side wall 22 and a second side wall 24 (FIG. 4). An input boot 25 is secured to the housing 12 at the input end 14.

An endless chain 26, having a plurality of spaced, transverse flights 27, is secured at the input end 14 of the housing 12 by a tail idler pulley 28. The tail idler pulley 28 is rotatably secured on a transverse tail shaft 30. The tail shaft 30 is secured within the housing 12 between the first side wall 22 and the second side wall 24.

At the output end 16, the endless chain 26 is secured within the housing 12 to a head sprocket 32. The head sprocket 32 is secured on a transverse head shaft 34. The head shaft 34 is secured to the housing 12 by a pair of bearings 36.

The conveyor 10 also includes a plurality of intermediate idler assemblies 38 for supporting the endless chain 26 between the input end 14 and the output end 16. Each idler assembly 38 has a transverse idler shaft 40 secured between the first side wall 22 and the second side wall 24. An idler pulley 42 (FIG. 3) is rotatably secured to each idler shaft 40. Each idler pulley 42 is aligned with the head sprocket 32 and the tail idler pulley 28. During operation of the conveyor 10, the idler assemblies 38 exert a downward force on the endless chain 26 such that the flights 27 are in contact with the bottom of the conveyor 10.

A drive assembly 44 is secured to the output end 16 of the housing 12 for imparting motion to the endless chain 26. The drive assembly 44 includes an electric motor 46, a reducer 48 and a drive belt 50 mounted between the output shaft 52 of the electric motor 46 and the input shaft 54 of the reducer 48. A drive chain 56 is mounted between the output shaft 58 of the reducer 48 and a drive sprocket 60. The drive sprocket 60 is secured to the head shaft 34.

In operation, particulate material entering the conveyor 10 at the input end 14 is initially supported by the input boot 25. Movement of the flights 27 by the rotation of the endless chain 26 pushes the material along an interior surface 62 (FIG. 3) of the lower wall 20 towards the output end 16. At the output end the material exits the housing 14 through an output chute (not shown).

As shown in FIGS. 3 and 4, a plurality of ceramic tiles 64, such as Cerasurf WS, manufactured by Coors & Ceramics Inc., Golden, Colo., are secured to the surface 62 and to a surface 66 of the input boot 25. The ceramic tiles 64 are substantially rectangular and are aligned in repeating transverse rows as most clearly shown in FIG. 4. The conveyor 10 also has a clean out gate 68, described in greater detail below, pivotally secured to the lower wall 20.

As shown in FIG. 4, a pair of guide plates 70, having a plurality of apertures 71 therein, are secured along the surface 62 between some of the ceramic tiles 64 along the path of travel of the flights 27. The guide plates 70 may, for example, be formed from a length of 5/8" steel plate such as HS 500 Wear Plates manufactured by High Strength QA Steel Inc., Houston, Tex.

A plurality of transverse plates are secured to the surface 62 at various locations thereon. At the input end 14, a lateral plate 72, which may, for example, be formed from a length of 5/8" HS 500 steel plate, is secured to surface 62. The plate 72 prevents the revolving flights 27 from contacting the vertical edges of the ceramic tiles 64 adjacent the plate 72. The plate 72 also provides support for the lower end 74 of the input boot 25 (FIG. 3). A similar plate (not shown) is secured at the output end 16.

A pair of lateral plates 76, which may, for example, be formed from a length of 5/8" HS 500 steel plate, are secured to portions of the surface 62 bordering opposite sides of a rectangular opening 78 (FIG. 3). The opening 78 is sized for receiving the clean out gate 68. The plates 76 provide lateral support and protect the vertical edges of the ceramic tiles 64 adjacent thereto.

The clean out gate 68 has a plurality of ceramic tiles 64 secured to the inner surface 80 thereof. In the closed position (FIG. 4) the surface 80 is in planar alignment with the surface 62. The clean out gate 68 also has a pair of transverse plates 82, which may, for example, be formed from a length of HS 500 steel plate, secured along the ends thereof adjacent plates 76. The plates 82 provide lateral support and protect the vertical edges the ceramic tiles 64 secured to the clean out gate 68.

As shown in FIG. 4, the guide plates 70a, constructed of the same material as guide plates 70, are positioned on the sides of gate 68 adjacent the first and second walls, 22 and 24 respectfully. In this way, the ceramic tiles 64 secured to the clean out gate 68 that are adjacent the first and second walls, 22 and 24 respectively, are supported by the guide plates 70a when the clean out gate 68 is in a closed position. In this way, guide plates 70 and 70a provide a substantially continuous metal guide surface between the input end 14 and the output end 16 of the conveyor 10.

As shown in FIGS. 5 and 6, each ceramic tile 64 has at least one aperature 84 therethrough. The upper end 86 of the aperature 84 communicates with the upper surface 87 of the tile, and the lower end 88 of the aperature communicates with the lower surface 89 of the tile. About the lower half of the aperature 84 is reduced in diameter providing downwardly and inwardly converging side walls 90.

The ceramic tiles 64 are secured to the metal surfaces 62, 66 and 80, by first applying a layer of adhesive 92 between the lower surface 89 of the ceramic tile 64 and the adjacent surface of the conveyor 10. The adhesive 92 may also be applied between the sides of adjacent tiles (not shown) and between the sides of tiles and the sides 94 of guide plates 70 (FIG. 7). It will be appreciated that the adhesive 92 may also be applied between the sides of the ceramic tiles 64 and any adjacent metal surfaces on the conveyor 10.

A silicon adhesive, such as General Electric RTV Silicon Rubber Adhesive Sealant manufactured by the Silicon Products Division of General Electric, Waterford, N.Y., can be used for this purpose. Generally, a 3/16" bead of adhesive around the perimeter of the lower surface 89 and along the side surfaces of the tiles is sufficient.

As shown in FIG. 5, a frustro conically shaped hollow insert 96 is inserted into the aperature 84. The insert 96 has flexible sides sized for conformably engaging the converging side walls 90. A threaded bolt 100, having a tapered head 102, extends through the insert 69 and an aperature 104 in the conveyor 10. The bolt 100 extends beyond the conveyor 10. A washer 106 is placed on the portion of the bolt 100 extending beyond the conveyor 10 and a nut 108 is threaded onto the bolt 100. As the nut 108 is tightened snugly against the washer 106, the tapered head 102 engages the flexible sides of the insert 96. In this way, the sides of the insert are expanded against the converging side walls 90 for retaining the ceramic tile 64 in place. In the preferred embodiment, the ceramic tiles 64 are secured only to the clean out gate 68 in the above described manner. Additionally, a ceramic cap 109 is secured by adhesive 92 in the upper end portion of each aperature 84. The ceramic cap 109 is positioned above the tapered head 102 of the bolt 100 and lies substantially flush with the upper surface 87 of the ceramic tile 64.

As illustrated in FIG. 6, a modified insert 96a is inserted into the aperature 84. Insert 96a is constructed in a manner similar to insert 96, except that insert 96a is made in sections rather than having flexible sides. The ceramic tile 64 is retained in place on the conveyor 10 by plug welding the lower portion of the insert 96a to the conveyor 10. In the preferred embodiment, with the exception of the clean out gate 68 as noted above, the ceramic tiles 64 are secured to the surfaces (62 and 66) of the conveyor 10 by plug welding the insert 96a as previously described. The ceramic ca 109 is secured above the insert 96a and is retained in a flush position with the upper surface 87 of the ceramic tile 62 by the adhesive 92.

As shown in FIGS. 7 an 8, the guide plate 70 is secured to the conveyor 10 by plug welding a portion of the guide plate 70 adjacent the aperature 71 to the conveyor 10. It will be appreciated that the plates 70a, 72, 76 and 82 may be secured to the conveyor 10 in a similar manner. As shown in FIG. 7, an upper portion 112 of the guide plate 70 extends above the upper surfaces 87 of the ceramic tiles 64. In this embodiment, the guide plates 70 prevent contact between the revolving flights 27 and the ceramic tiles 64.

As shown in FIG. 8, the guide plate 70 is worn through use such that the upper surface 112 is level with the top of the ceramic tiles 64. In this condition, the guide plates 70 still prevent damaging contact between the revolving flights 27 and the ceramic tiles 64. Damaging contact is defined as contact by one or more flights against one or more ceramic tiles wherein such contact results in damage to one or more ceramic tiles. If desired, the guide plates 70 may be formed with the thickness shown in FIG. 8.

It will be appreciated that the upper surface 112 of the guide plates 70 may actually extend below (not shown) the level of the ceramic tiles 64. In this embodiment, the guide plates 70 also prevent damaging contact between the revolving flights 27 and the ceramic tiles 64. This is so because of the resilient nature of the silicon adhesive 92. The adhesive 92 permits deflection of the ceramic tiles 64 toward a supporting surface (62, 66 and 80) of the conveyor 10 in response to contact by one or more of the flights, such that the ceramic tiles 64 are not damaged by said contact. Therefore, the height of the guide plates 70 must be of sufficient dimension to permit the ceramic tiles 64 to deflect in response to contact by one or more flights 27. When the guide plates 70 become worn to the extent that they no longer protect the ceramic tiles 64 from damaging contact by the flights 27, the guide plates 70 may be replaced.

It is understood that the amount of deflection of the ceramic tiles 64 will depend upon the thickness and composition of the adhesive 92 applied between the ceramic tiles 64 and the conveyor 10. It is further understood that the height of plates 70a with respect to adjacent ceramic tiles 64 is governed by the same principals applicable to plates 70.

Changes may be made in the combination and arrangement of parts or elements as heretofore set forth in the specification and shown in the drawings without departing from the spirit and scope of the invention as defined in the following claims.

We claim:

1. A conveyor apparatus comprising:
a housing having an input end and an output end;
a conveyor means secured to the housing for conveying material from the input end of the housing to the output end;
a wear resistant material secured to portions of the housing along the path of the travel of the material comprising a plurality of tiles; and
means for preventing the conveyor means from contacting the wear resistant material.

2. A conveyor apparatus comprising:
a housing having an input end and an output end;
a conveyor means secured to the housing for conveying material from the input end of the housing to the output end;
a wear resistant material secured to portions of the housing along the path of the travel of the material; and
means for preventing the conveyor means from contacting the wear resistant material separate from the conveyor means comprising:
at least one guide structure extending substantially the length of the housing and secured to portions of the housing along the path of travel of the material such that a portion of the guide structure extends between the wear resistant material and the conveyor means.

3. A conveyor apparatus comprising:
a housing having an input end and an output end;
conveyor means secured to the housing for conveying material from the input end of the housing to the output end;
a wear resistant material secured to portions of the housing along the path of the travel of the material comprising a plurality of ceramic tiles; and
means for preventing the conveyor means from damagingly contacting the wear resistant material.

4. A conveyor apparatus comprising:
a housing having an input end and output end;
conveyor means secured to the housing for conveying material from the input end of the housing to the output end;
a wear resistant material secured to portions of the housing along the path of travel of the material; and
means for preventing the conveyor means for contacting the wear resistant material separate from the conveyor means comprising:
at least one guide structure extending substantially the length of the housing and secured to portions of the housing along the path of travel of the material such that the guide structure and the wear resistant material form a planar surface.

5. An apparatus for conveying material comprising:
a housing having an input end and an output end and a substantially flat elongated surface along which material is conveyed between the input and the output end;
wear resistant material secured along said surface preventing the material being pushed from contacting said surface;
a plurality of flights adapted to be moved along said wear resistant material to push the material along said wear resistant material;
at least one endless chain interconnecting the flights for moving the flights along said surface; and
stationary means subject to wear for supporting the flights out of contact with the wear resistant material as the flights move along the lengths of said surface until said means becomes worn a predetermined extent.

6. The apparatus of claim 5 wherein the means for supporting the flights from contacting the wear resistant material comprises at least one guide structure extending substantially the length of the housing and secured to portions of the housing along the path of travel of the material such that a portion of the guide structure extends between the wear resistant material and the flights.

7. An apparatus for conveying material comprising:
a housing having an input end and an output end and a substantially flat elongated surface along which material is conveyed between the input end and the output end;
wear resistant material secured along said surface preventing the material being pushed from contacting said surface comprising a plurality of ceramic tiles; and
a plurality of flights adapted to be moved along said wear resistant material to push the material along said wear resistant material;
at least one endless chain interconnecting the flight for moving the flights along said surface;
means subject to wear for supporting the flights out of contact with the wear resistant material as the flights move along the lengths of said surface until said means becomes worn a predetermined extent.

8. An apparatus for conveying material comprising:
a housing having an input end and output end and a substantially flat elongated surface along which material is to be conveyed between the input and the output end;
wear resistant material secured along said surface preventing the material being pushed from contacting said surface;
a plurality of flights adapted to be moved along said wear resistant material to push the material along said wear resistant material;
at least one endless chain interconnecting the flights for moving the flights along said surface; and
stationary means subject to wear for supporting the flights out of damaging contact with the wear resistant material as the flight move along the length of said surface until said means becomes worn a predetermined extent.

9. The apparatus of claim 8 wherein the means for supporting the flights out of damaging contact with the wear resistant material comprises at least one guide structure extending substantially the length of the housing and secured to portions of the housing along the path of travel of the material such that the guide structure and the wear resistant material form a substantially planar surface.

10. An apparatus for conveying material comprising:
a housing having an input end and output end and a substantially flat elongated surface along which material is to be conveyed between the input end and the output end;
wear resistant material secured along said surface preventing the material being pushed from contacting said surface comprising a plurality of ceramic tiles; and a plurality of flights adapted to be moved along said wear resistant material to push the material along said wear resistant material;
at least one endless chain interconnecting the flights for moving the flights along said surface;
means subject to wear for supporting the flights out of damaging contact with the wear resistant material as the flights move along the length of said surface until said means becomes worn a predetermined extent.

* * * * *